United States Patent [19]

Sturgis

[11] Patent Number: 5,156,180
[45] Date of Patent: Oct. 20, 1992

[54] CONNECTOR WITH A SAFETY SHUT-OFF FEATURE

[76] Inventor: Malcolm Sturgis, 6227 Rosebury Ave., St. Louis, Mo. 63105

[21] Appl. No.: 702,603

[22] Filed: May 17, 1991

[51] Int. Cl.⁵ .................................................. F16K 17/38
[52] U.S. Cl. ..................................... 137/79; 137/68.1; 137/560; 251/149.7; 251/129.21
[58] Field of Search .................. 251/129.21, 148, 89.5, 251/149.6, 149.7; 137/79, 560, 68.1, 557

[56] References Cited

U.S. PATENT DOCUMENTS

| | | | |
|---|---|---|---|
| 1,281,329 | 10/1918 | Flannery et al. | |
| 2,056,085 | 9/1936 | Alles | 173/264 |
| 2,294,693 | 9/1942 | Ray | 137/79 |
| 2,360,434 | 10/1944 | Manning | 177/311 |
| 2,420,148 | 5/1947 | Ostergren | 177/351 |
| 2,506,936 | 5/1950 | Murray | 137/79 |
| 2,544,567 | 3/1951 | Rundell | 201/63 |
| 2,553,986 | 5/1951 | Statham | 175/183 |
| 2,566,192 | 8/1951 | Grooms | 137/79 |
| 2,638,118 | 5/1953 | Chandler | 251/129.21 |
| 2,687,277 | 8/1954 | Bremer et al. | 251/129.21 |
| 2,691,698 | 10/1954 | Schmidt | 179/5 |
| 2,759,175 | 8/1956 | Spalding | 340/242 |
| 2,930,013 | 3/1960 | Bruch | 336/185 |
| 2,976,865 | 3/1961 | Shipley | 128/2.05 |
| 3,299,417 | 1/1967 | Sibthorpe | 340/242 |
| 3,477,019 | 11/1969 | Hartmann | 324/52 |
| 3,721,898 | 3/1973 | Dragoumis et al. | 324/65 R |
| 3,800,826 | 4/1974 | McCann | 137/560 |
| 3,833,015 | 9/1974 | Kneuer | 251/129.21 |
| 4,161,215 | 7/1979 | Brourne, Jr. et al. | 251/129.21 |
| 4,486,060 | 12/1984 | Currall | 137/560 |
| 4,700,743 | 10/1987 | L'ttenaff et al. | 137/560 |

*Primary Examiner*—A. Michael Chambers
*Attorney, Agent, or Firm*—Senniger, Powers, Leavitt & Roedel

[57] ABSTRACT

A connector with a safety shut-off feature for connecting a gas appliance to a source of gas. The connector comprises a tubular line, a first coupling adjacent the inlet end of the line for releasably coupling the line to the source of gas, a second coupling adjacent the outlet end of the line for releaseably coupling the line to the appliance, and a valve associated with the line movable between an open position for permitting passage of gas through the line and a closed position for preventing passage of gas through the line. An electric circuit controls the operation of the valve. The circuit comprises an electrical conductor on the line designed to break or otherwise become non-conductive in response to excessive heating or damage to the line, thereby causing an interruption in the flow of electric current through the electric circuit. The valve is responsive to such interruption to move to its closed position to prevent further passage of gas through the line.

15 Claims, 4 Drawing Sheets

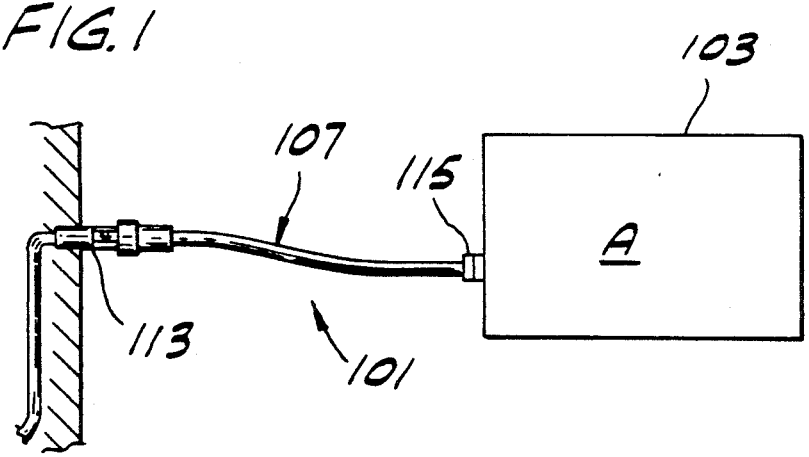
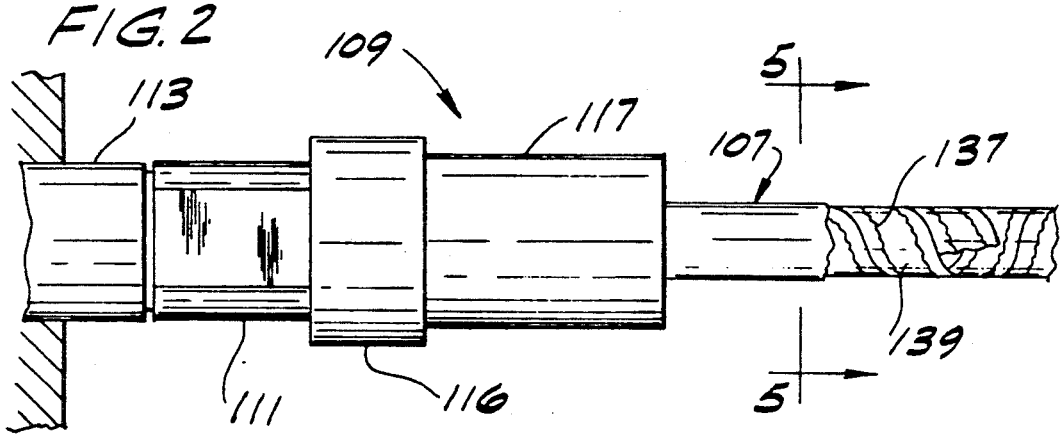
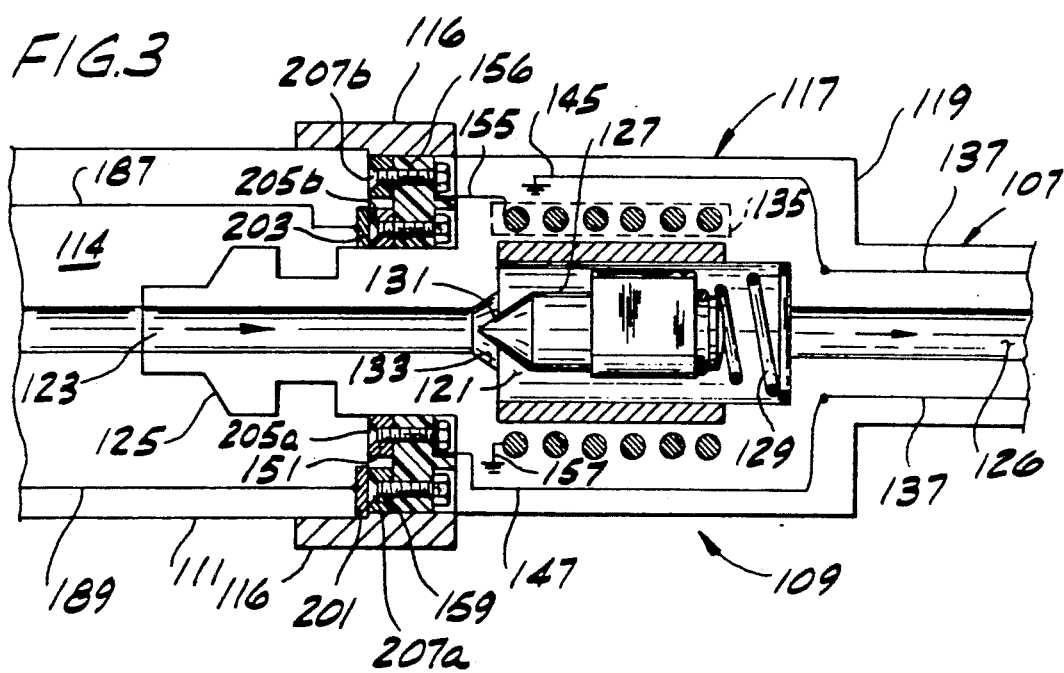

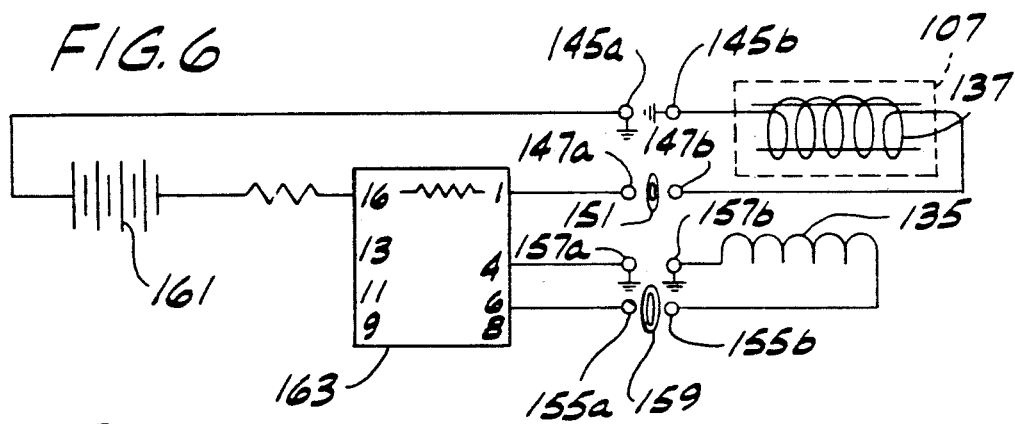
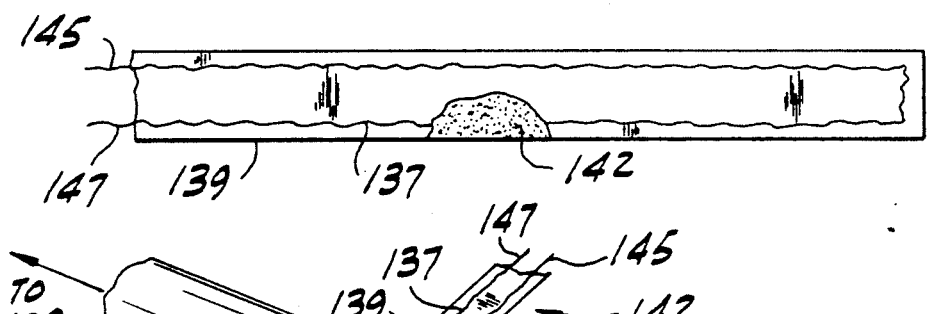
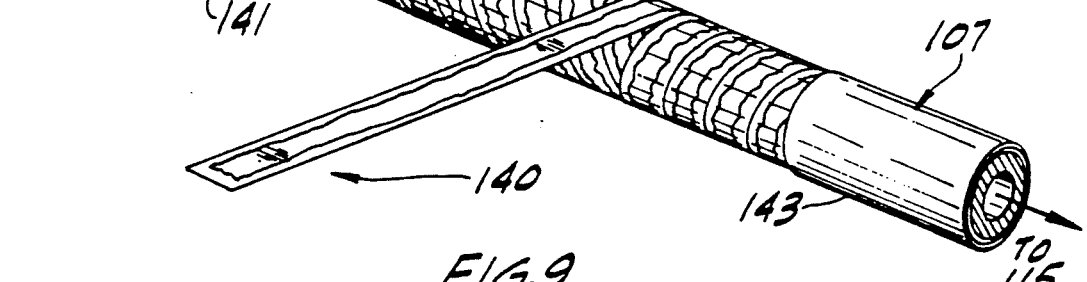
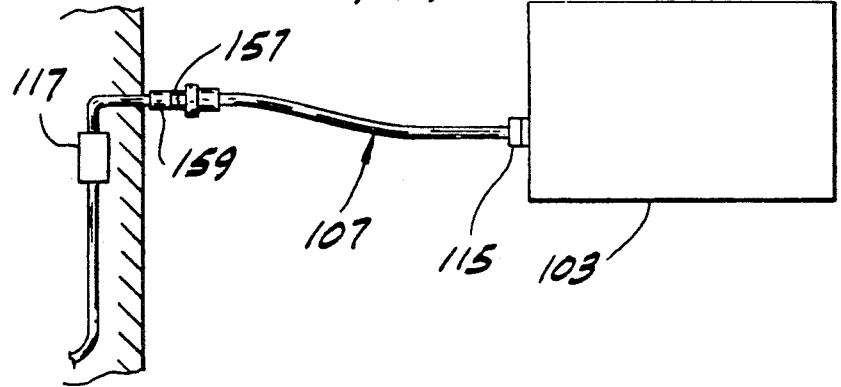

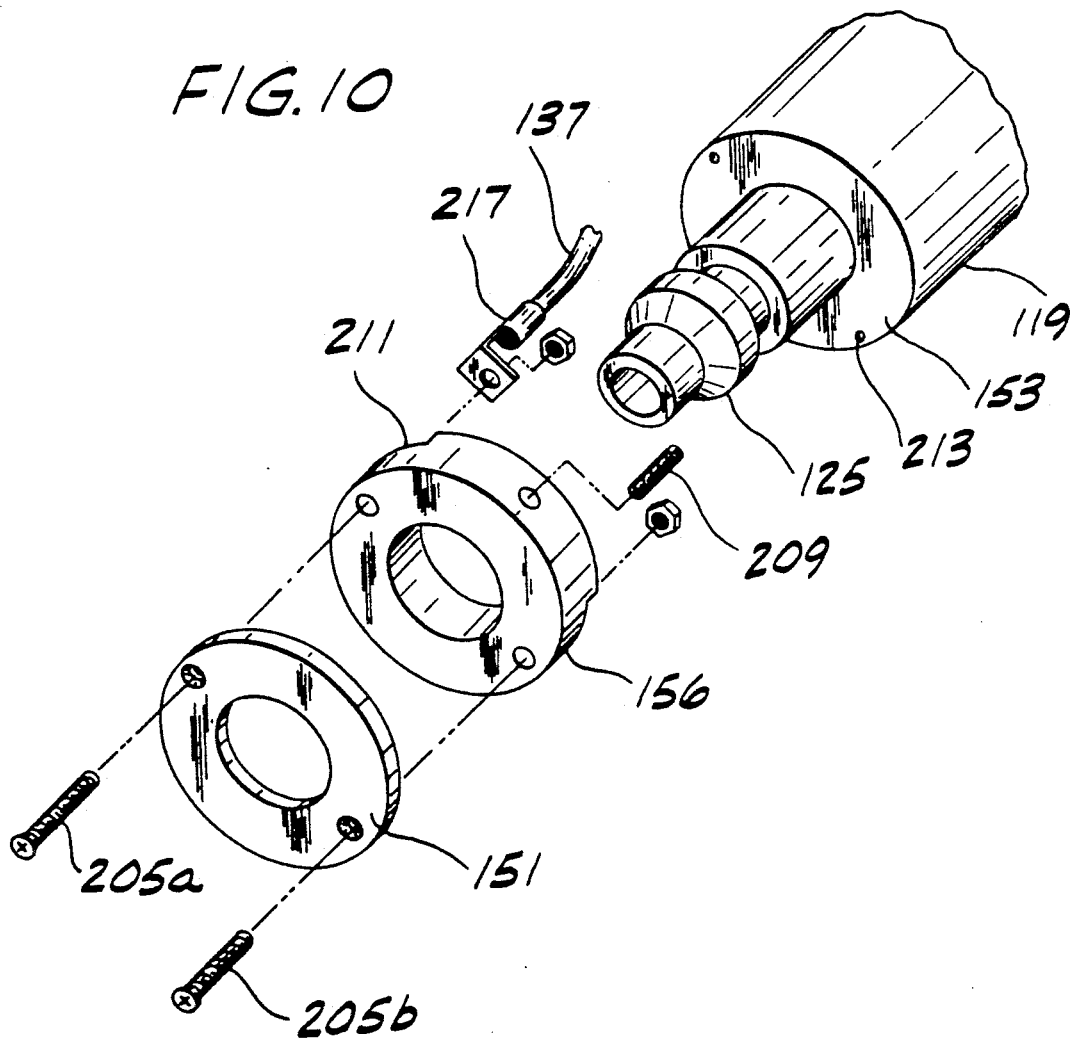

CONNECTOR WITH A SAFETY SHUT-OFF FEATURE

BACKGROUND OF THE INVENTION

This invention relates to devices for connecting a gas appliance to a source of gas, such as propane gas, and more particularly to such a device which has a safety shut-off feature for preventing flow of gas to the appliance in the event of an occurrence which might cause gas leakage or a fire hazard.

It is expected that the use of gas appliances will increase to the point where gas wall outlets in buildings will be provided on a wide scale. It will be necessary, therefore, to have safe and reliable connectors for connecting gas appliances to the gas outlets. In the event the connector is subjected to excessive heat or damaged, it is important that the supply of gas to the appliance be shut off to prevent possible leakage of gas, or an explosion, or some other dangerous incident.

Reference may be made to U.S. Pat. Nos. 3,721,898, 2,691,698 and 2,056,085 for a disclosure of devices which may be considered generally relevant to this invention.

SUMMARY OF THE INVENTION

Among the several objects of this invention may be noted the provision of an improved connector of this invention which has a safety shut-off feature for preventing flow of gas to an appliance in the event of an occurrence (such as excessive heat or damage to the connector) which might cause gas leakage or an explosion; the provision of such a connector which is easy to use; and the provision of such a connector which is durable and reliable in operation.

In general, a connector with a shut-off feature of this invention comprises a tubular line with inlet and outlet ends, first coupling means adjacent the inlet end of the line for releaseably coupling the line to the source of gas, second coupling means adjacent the outlet end of the line for releaseably coupling the line to the appliance, and valve means associated with the line movable between an open position for permitting passage of gas through the line and a closed position for preventing passage of gas through the line. Electric circuit means is provided for controlling the operation of the valve means. The electric circuit means comprises indicator means on the line for conducting electricity. The indicator means is adapted to break or otherwise undergo a change in electrical resistance in response to excessive heating or damage to the line, thereby causing a change in the flow of electric current through the electric circuit means. The valve means is responsive to such change to move to its closed position to prevent further passage of gas through the line.

Other objects and features will be in part apparent and in part pointed out hereinafter.

BRIEF DESCRIPTION OF THE DRAWINGS

FIG. 1 is a view showing a connector of this invention connecting a gas appliance to a source of gas.

FIG. 2 is a view showing the coupling of a gas line to a gas wall outlet.

FIG. 3 is a cross-sectional view taken longitudinally of a quick-connect coupling component of the connector.

FIG. 6 is a schematic diagram of the electrical circuit of this invention.

FIG. 7 is a view of an indicator wire before it has been wound onto a gas line.

FIG. 8 is a view of an indicator wire being wound onto a gas line.

FIG. 9 is a view showing an alternative design of a connector of this invention connecting a gas appliance to a source of gas where the solenoid valve is located upstream from the coupling component in the wall.

FIG. 10 is an expanded view of a single concentric ring, an insulating ring and an annular shoulder for use with the gas appliance connector shown in FIG. 9.

Corresponding reference numerals designate corresponding parts throughout the several views of the drawings.

DETAILED DESCRIPTION OF THE PREFERRED EMBODIMENT

Figure 4:
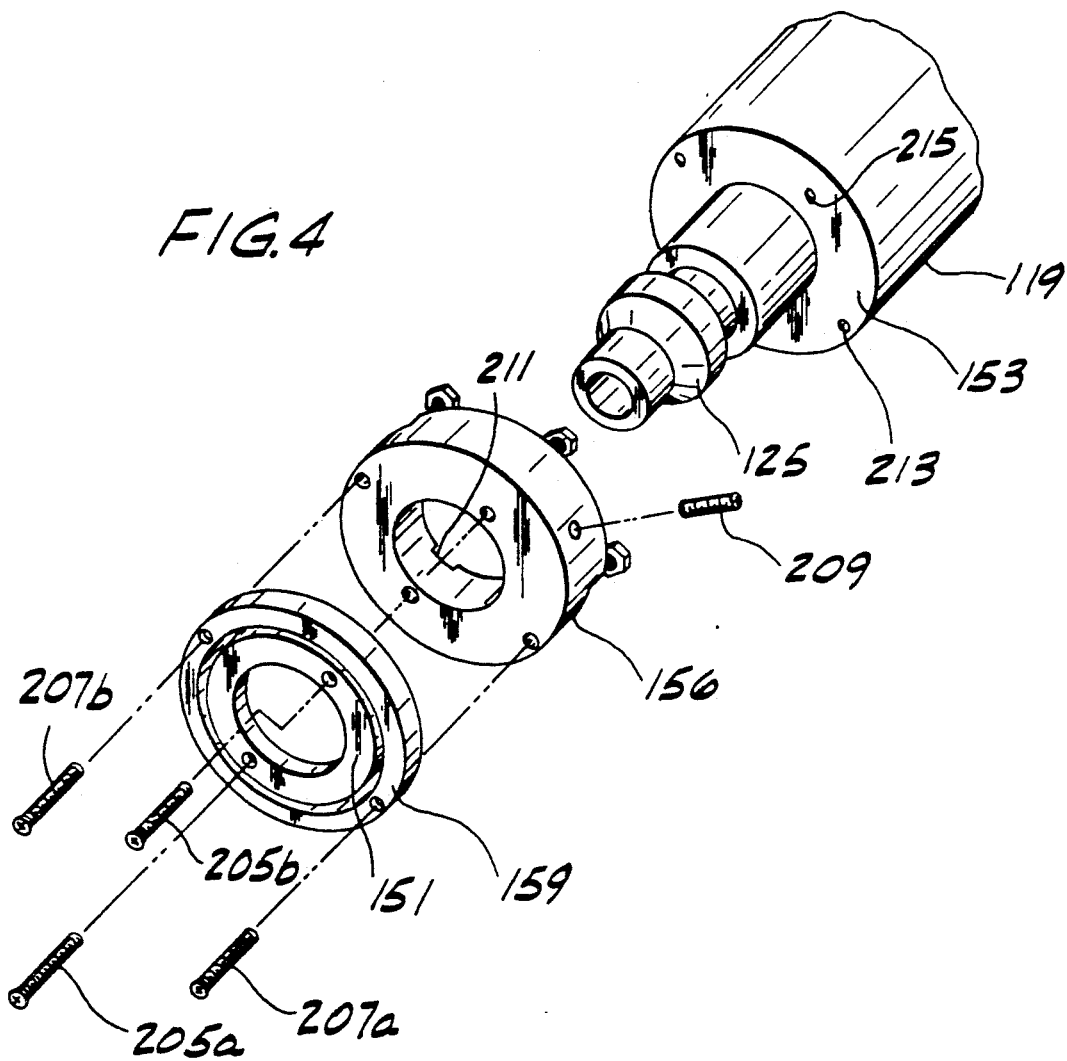
FIG. 4 is an exploded view showing component parts of two concentric rings, an insulating ring and an annular shoulder.

Referring now to the drawings, and first to FIG. 1, there is generally shown at 101 a connector of this invention connecting a gas appliance 103 to a source of gas, in this case a gas wall outlet 113.

As illustrated in FIG. 2, the connector 101 comprises a tubular line generally indicated at 107 defining a passage for flow of gas therethrough, and first coupling means adjacent the inlet end of the line (its left end as viewed in FIG. 1) including a first quick-connect coupling component 109 attached to the line 107 and a mating quick-connect coupling component 111 attached to the wall outlet 113, the two coupling components being releaseably interengageable for connection of the wall outlet 113 to the gas line 107. The coupling component 111 attached to the wall outlet 113 is self-sealing to prevent the escape of gas from the wall outlet 113 when the two coupling components 109 and 111 are not engaged. To accomplish this, the coupling component 111 may include, for example, a socket 114 and a poppet valve (not shown) immediately upstream from the socket 114 which is normally spring-biased toward a closed position. The coupling component 109 on the line 107 has a nipple 125 which, when inserted into the socket, is engageable with the poppet valve to open the valve against the bias of its spring to permit the passage of gas through the line 107. The two coupling components are releaseably held together by a conventional ball-bearing sleeve lock 116. As shown in FIG. 1, the connector further comprises second coupling means 115 (which may be a standard threaded connector) for releaseable connection of the line 107 to a fitting on the appliance 103.

In accordance with this invention, as shown in FIG. 3, the connector also includes valve means comprising a solenoid value generally designated 117, associated with the line 107 and movable between an open position for permitting passage of gas through the line 107 and a closed position for preventing passage of gas through the line 107. The solenoid valve 117 has a generally cylindric metal body 119 which forms part of the first coupling component 109. A passage 121 through the body 119 communicates with the passage 123 through the nipple 125 and the passage 126 defined by the tubular line 107. A plunger valve member 127 of the solenoid valve is disposed in an enlarged portion of the passage 121 and is urged by means of a spring 129 toward a closed position in which a conical end 131 of the valve member 127 is engageable with a seat 133 formed in the body for blocking flow of gas through the line 107. When the coil 135 of the solenoid is energized, the plunger valve member 127 is adapted to move to its open position (as shown in FIG. 3) to permit the flow of gas through the line 107. The solenoid valve 117 is suitably joined to the nipple 125 of the coupling component 109 and to the line 107.

Figure 5:
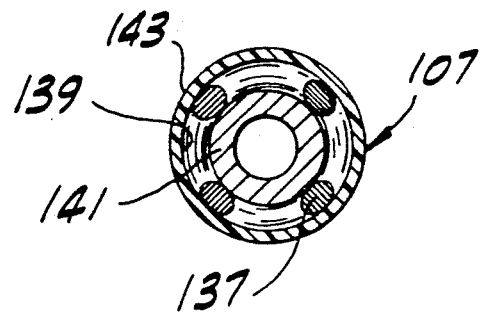
FIG. 5 is a cross-sectional view of a gas line of this invention.

The operation of the solenoid valve 117 is controlled by electrical circuit means comprising indicator means 137 on the hose 141 comprising line 107. It will noted in this regard that the line 107 may comprise a flexible hose of thermal plastic, rubber or other suitable material compatible with fuel gas and capable of withstanding the pressures involved (e.g., 5–7 psi gas). As shown in FIG. 5, the aforesaid indicator means 137 may be a small diameter, temperature sensitive wire 137 extending at least a substantial portion of the length of the line 107, and preferably its entire length. The wire 137 may be, for example, a 0.010–0.015 in. diameter wire of a suitable alloy having a melting temperature in the range of 180°–250° F. In particular, wire commonly sold under part number Indelloy No. 8 by the Indium Corporation of America and containing 44% indium, 42% tin, and 14% cadmium may be used. In the embodiment shown in FIGS. 7 and 8, the wire 137 is spiral wound around the hose 141, with the separation between adjacent winds being relatively close (e.g., $\frac{1}{8}$ in.–$\frac{1}{4}$ in.). The wire 137 is secured in fixed position relative to the hose 141 by means of a strip of insulating material 139 (e.g., vinyl) spiral wound on the hose 141 with the wire 137 being disposed between the strip 139 and the hose 141. The strip preferably has adhesive 142 on one side to insure that the strip 139 adheres to the hose 141 and to the wire 137 to hold the wire 137 in fixed position relative to the hose 141. The line 107 also preferably includes an outer protective sheath 143 of suitable material such as vinyl or PVC or EPA covering the hose 141, the strip 139 and the wire 137 spiral wound on the hose 141. The outer surface of the sheath 143 should be smooth to prevent snags and to facilitate cleaning of the line.

As wound on the hose 141, the wire 137 forms a loop with two leads 145 and 147 adjacent the downstream end of the first coupling component 109 in FIG. 3. Considering now both FIGS. 3 and 4, lead 145 is connected via a suitable connector to the metal body 119. This is symbolically shown in FIG. 3 where lead 145 is grounded. The other lead 147 is connected via screw and nut fastener 205a to a conductive ring 151 coaxially mounted on the nipple 125. The coil 135 of the solenoid 117 also has two leads, 155 and 157. Lead 157 is connected via a suitable connector to the metal body 119. Again, this is symbolically shown in FIG. 3 as a grounded connection. Lead 155 is suitably connected via screw and nut fastener 207b, to a second conductive ring 159 coaxially mounted on the nipple 125 and concentric with ring 151, the two rings being sized so that the outer edge of the inner ring 151 is spaced from the inner edge of the outer ring 159. Rings 151 and 159 are attached by fasteners 205 and 207, respectively, to an insulating ring 156 coaxially mounted on the nipple 125 immediately adjacent an annular shoulder 153 formed at the juncture of the body 119 and the nipple 125. The insulating ring 156 is held in position on the base of nipple 125 by a set screw 209. It is to be noted that fasteners 207a and 207b are shown for convenience in FIG. 3 rotated 90° out of their true position and that FIG. 4 accurately shows the true position of fasteners 207a and 207b. Recesses 211 are provided in the downstream face of ring 156 for receiving the fasteners 205a, 205b, 207a and 207b so that they do not extend beyond the downstream surface of ring 156. The two rings 151 and 159 are therefore electrically insulated from each other and from body 119. Holes such as 213 and 215 provide access for passing the leads 147 and 155 through the body 119 for connection to the appropriate screw and nut fastener. It is to be noted that other suitable means for making electrical contact across the coupling of coupling components 109 and 111 could be used in place of rings 151 and 159 without departing from the scope of this invention. It is also to be noted that other suitable fastener means, such as rivets, grommets, solder, adhesives, and the like, could be used in place of fasteners 205 and 207 without departing from the scope of this invention.

In operation when the first and second coupling components 109, 111 are coupled, concentric rings 151 and 159 make electrical contact with contact pads 201 and 203 shown in FIG. 3. These pads 201 and 203 are attached by suitable means to mating coupling component 111, and may be spring loaded copper clips, fixed metallic blocks, or any other suitable contact medium. Leads 187 and 189 attach to pads 201 and 203, respectively, for connection to the remaining circuit elements per the schematic diagram in FIG. 6.

Electric circuit means is shown in FIG. 6 as further comprising a low-voltage DC Power source 161 (e.g., 24 volts) and switch means in the form of a relay 163 (such as an "Omron" relay model G2VN-234P-VS-DC24). The relay 163 has a lead 147a which makes electrical contact with lead 147b through ring 151. Relay 163 also has a lead 155a which makes electrical contact with lead 155b through ring 159. Leads 145a and 157a are connected in common with leads 145b and 157b through the metal bodies of the first coupling component 109 and the mating coupling component 111. The arrangement is such that when the coupling components 109 and 111 are engaged, a path is defined for flow of electricity through the coil 135 of the solenoid valve 117 (to move the plunger valve member 127 to its open position) and through the wire 137 in the line 107.

In the event the line 107 is subjected to temperatures which exceed a predetermined temperature (the melting point of the wire 137), the wire 137 will become nonconductive, thereby causing an interruption in the circuit. A normally-closed switch in the relay 163 opens in response to this interruption, which deenergizes the coil 135 in solenoid 117 and causes its plunger valve member 127 to close for blocking further flow of gas through the line 107. Thus a possible fire and/or explosion is prevented. It will be understood that the temperature at which the wire 137 becomes non-conductive can be varied as desired by varying the composition and/or other characteristics of the wire 137.

Similarly, if the line 107 is damaged (e.g., cut, punctured, abraded, etc.) to the extent the wire 137 is broken or otherwise becomes non-conductive, the flow of gas through the line 107 will be immediately shut off. To ensure safety, the wire 107 should be sufficiently frangible that it becomes non-conductive in the event of any line damage sufficient to cause possible gas leakage.

Moreover, as noted above, the wire 137 should extend substantially the full length of the line 107 and be wound at closely spaced intervals to ensure a high degree of reliability.

FIGS. 7 and 8 illustrate a method of applying the wire 137 to the hose 141. In accordance with this method, a loop of wire 137 is placed on the adhesive side of a strip of insulating material 139, with leads 145 and 147 of the wire projecting from end 142 of strip 139. Using the adhesive strip 139 properly positions the wire 137 for winding and facilitates the winding process. In order to wind the strip 139 onto hose 141, the midpoint lengthwise of strip 139 is applied to the outlet end of hose 141. One half of the length of strip 139 is then spirally wound down the length of hose 141 to the inlet end where first coupling component 109 is attached. The other half of the length of strip 139 is then spirally wound in the direction opposite the first winding until the inlet end of hose 141 is again reached. By spirally wrapping strip 139 in this manner, the wire 137 is disposed between the strip 139 and the hose 141. The double winding in opposite directions creates a crossing pattern in the position of wire 137 for improved reliability of operation in sensing a dangerous condition. When the winding is complete, both ends 140 and 142 of strip 139 should be disposed adjacent the inlet end of hose 141. End 140 terminates in its final position on hose 141. End 142 is also wound to its final position on hose 141, but it is accessible to the downstream end of first coupling component 109 for connection of leads 145 and 147 to the remaining circuit elements shown schematically in FIG. 6. Other methods of securing the wire 137 to the hose 141 may also be suitable. It will be understood in this regard that spiral winding of the wire 137 on the hose 141 is not essential to the practice of this invention. After the wire 137 is secured in place, the protective sheath 143 is placed over the hose 141 and strip 139 and heated to shrink wrap the sheath 143 in place to provide a tight fit of the sheath 143 on the hose 141 and strip 139, thereby further securing the strip 139 and wire 137 in fixed position and protecting the wire 137 from minor physical incidents which would not damage the line but which might break the wire 137 absent the sheath.

FIG. 9 shows a connector of alternative design where the solenoid valve 117 is located upstream from the mating coupling component 157 suitably attached to the wall outlet 159. The construction and operation of this connector are essentially as described above. However, as shown in FIG. 10, only one concentric ring 151 is required because the electrical connections for the solenoid valve 117 do not need to be passed through the mating coupling component 157. The remaining components of FIG. 10 are marked with the corresponding numbers from FIG. 4 to show similar function of similar components. It will be noted that lead connector 217 may be used to connect wire 137 to ring 151 without passing wire 137 through first coupling component 109. The solenoid valve 117 may be placed at other suitable locations.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector with a safety shut-off feature for connecting a gas appliance to a source of gas, said connector comprising a tubular line with inlet and outlet ends, first coupling means adjacent the inlet end of the line for releaseably coupling the line to the source of gas, second coupling means adjacent the outlet end of the line for releaseably coupling the line to the appliance, valve means associated with the line movable between an open position for permitting passage of gas through the line and a closed position for preventing passage of gas through the line, and electric circuit means for controlling the operation of said valve means, said electric circuit means comprising indicator means on the line for conducting electricity and adapted to break or otherwise undergo a change in electrical resistance in response to excessive heating or damage to the line, thereby causing a change in the flow of electric current through said electric circuit means, said valve means being responsive to such change to move to its said closed position to prevent further passage of gas through the line.

2. A connector as set forth in claim 1 wherein said indicator means comprises a small diameter, temperature sensitive wire secured to the line and extending a substantial portion of the length of the line.

3. A connector as set forth in claim 2 wherein said wire is adapted to become non-conductive in the event the line is exposed to temperatures in excess of a predetermined temperature.

4. A connector as set forth in claim 3 wherein the predetermined temperature is about 180°–250° F.

5. A connector as set forth in claim 2 wherein said wire is spiral wound on the line.

6. A connector as set forth in claim 5 wherein said wire is secured to the line by a strip of material wrapped around the line, said connector further comprising an outer protective sheath covering said line, said strip wrapped around the line, and said wire.

7. A connector as set forth in claim 6 wherein said line is adhesively secured to said strip, and wherein said strip is spiral wrapped on the line.

8. A connector as set forth in claim 1 wherein said valve means is disposed immediately downstream from said first coupling means.

9. A connector as set forth in claim 8 wherein said valve means comprises an electrically operated solenoid valve which, when energized, is adapted to move to its open position and, when deenergized, is adapted to move to its closed position.

10. A connector as set forth in claim 9 wherein said first coupling means comprises first and second quick-connect coupling components, the first component being attached to the line and the second component to the source of gas, said electrical circuit means defining an electrical circuit through said first and second coupling components when the components are connected, said electrical circuit including said solenoid valve, said electrical conductor means, a power source and switch means, the arrangement being such that in the event said electrical conductor means becomes non-conductive, said switch means is adapted to deenergize said solenoid.

11. A connector as set forth in claim 1 wherein said first coupling means comprises first and second quick-connect coupling components, the first component being attached to the line and the second component to the source of gas, said electrical circuit means defining an electrical circuit through said first and second coupling components when the components are connected, said electrical circuit including said solenoid valve, said indicator means, a power source and switch means, the arrangement being such that in the event said indicator means becomes non-conductive, said switch means is adapted to deenergize said solenoid.

12. A connector as set forth in claim 11 wherein said valve means is disposed upstream from said second coupling component.

13. A connector as set forth in claim 1 wherein said line is a flexible hose, and wherein said indicator means comprises a small diameter, temperature sensitive wire extending along the hose.

14. A connector as set forth in claim 13 wherein said wire is adapted to become non-conductive in the event the line is exposed to temperatures in excess of about 180°–250° F.

15. A connector as set forth in claim 13 wherein said wire is spiral wound around said hose substantially the entire length of the hose.

* * * * *